Patented July 4, 1939

2,164,871

UNITED STATES PATENT OFFICE 2,164,871

CEMENT COMPOSITION FOR MASON'S MORTAR

Adelbert C. Eichenlaub, Dearborn, Mich., assignor to Peerless Cement Corporation, Detroit, Mich., a corporation of Michigan No Drawing. Application May 7, 1937, Serial No. 141,354

15 Claims. (Cl. 106—24)

This invention relates to cement compositions and more especially to a cement composition for mason's mortar or similar mortars which contain as essential ingredients, ground cement clinker, precipitated calcium carbonate, clay, and gypsum.

The principal object of this invention is to improve the art of cement compositions.

A further object is to provide a cement composition especially adapted for forming a mason's mortar or the like that possesses the characteristics of notably fineness of grain structure, high plasticity and uniformly high strength.

Another object is to provide a cement composition for mason's mortar or the like of a dense nature but which is of proper plasticity and weight for easy handling.

A further object is to provide a mason's mortar or the like that is non-caustic and one that does not effect efflorescence during aging.

Another object is to provide a cement composition for mason's mortar or the like, which composition has a high sand carrying capacity.

Another object is to provide a mason's mortar or the like that is of a light natural color and is non-staining, thus adapting the mortar for tile work, finished stonework, etc.

It is also an object of the invention to provide a comparatively dense mortar which is more than ordinarily waterproof, which has high heat insulating and resisting qualities and one which has a low rate of expansion and contraction.

Other objects, features and advantages will become apparent from the following description and appended claims.

This invention is based on the discovery that a more than ordinary dense mortar may be produced by employing sand or similar aggregate and a cement composition which includes approximately 47% Portland cement clinker, sintered lumps of calcareous and argillaceous materials; from 30 to 47% precipitated calcium carbonate, a waste produce from the manufacture of alkali, (sodium hydroxide), said waste product being washed with water until substantially free from alkali; from 20 to 3% of any desired common variety of clay; and approximately 3% of gypsum, calcium sulphate, for controlling the setting time of the mortar.

A specific embodiment of a mason's mortar according to this invention is as follows:

| | Parts by weight |
|---|---|
| Aggregate | 300 |
| Ground Portland cement clinker | 47 |
| Precipitated calcium carbonate | 30–47 |
| Clay | 20–3 |
| Gypsum | 3 |

The cement composition employed in the above mortar comprises approximately 47% ground Portland cement clinker, from 30 to 47% precipitated calcium carbonate, from 20 to 3% clay, and approximately 3% gypsum. To the above composition may be added approximately 0.2% tallow, or other fatty or waxy material, for water proofing purposes.

Thus in making a mortar of the above indicated composition, approximately three parts of aggregate to one part of the cement composition, by weight, together with water, are used. When sand is employed as the aggregate, half-sharp, half-flat sand, is preferably employed.

The Portland cement clinker employed in the above cement composition has approximately the following analysis:

| | |
|---|---|
| CaO | 67 |
| $SiO_2$ | 21 |
| $Al_2O_3$ | 6.8 |
| $Fe_2O_3$ | 3.6 |
| MgO | 1.2 |

The precipitated calcium carbonate employed in the above cement composition is a waste product resulting from the production of caustic soda. In order to employ this alkali waste product for the present purposes, it is washed with water until substantially free from alkali. The alkali content of the present cement composition is held to from .1 to .5 of 1% in order to prevent efflorescence, i. e., the formation of fine white crystals on the surface of the finished mortar, and being not greater than .03 of 1% when a highly non-staining cement is desired. The grain size of the precipitated calcium carbonate is extremely fine, the diameter of the grains being of the order of one to three microns.

Practically any type of clay may be employed which has as its base constituent kaolinite and/or other related hydrous alumino silicates. The gypsum employed is finely ground calcium sulphate.

The precipitated calcium carbonate is preferably obtained as a waste product from the production of alkalies. The waste product together with a large amount of water is conveyed through pipes and is mixed with the clay in the present process. The water carries a considerable amount of alkalies in solution, the bulk of which must be removed. The most economical way to remove the major portion of such alkalies is by settling and decantation and then filtering by means of displacement washers. In addition to eliminating the alkalies, this procedure effects very complete mixing and intermingling of the clay and calcium carbonate. This material leaves the displacement washers in the form of filter cake which has a water content of about 30%.

As this material must be dried before grinding, it is preferred to effect such drying in conjunction with the manufacture of Portland cement clinker. The hot sintered lumps of Portland cement clinker are mixed with the filter cake to break up the latter, increase the drying by means of the residual heat in the cement clinker and increase the surface of the calcium carbonate and clay mixture subjected to drying conditions. To the dried mixture is then added about three percent gypsum, or the proper amount to effect the setting rate desired, and the mixture ground to a fineness such that about ninety-six percent of the material passes through a sieve having 325 meshes to the linear inch.

According to the theory of correct proportioning of mortar materials, the greatest strength and imperviousness is obtained with a mixture of greatest density, which means that a sand having the least void space will give a mortar the greatest strength and imperviousness. Half sharp and half flat sand has about twenty-five per cent voids, which voids, in the present instance, are filled with Portland cement, precipitated and substantially alkali-free calcium carbonate, clay and gypsum. A straight cement-sand mortar will have a maximum density when there is just sufficient cement to fill the voids in the sand and coat the particles of the sand. Cement is always the most expensive ingredient, so that it is desirable to reduce the proportion of cement to a minimum in order to effect economy.

According to the present invention, the voids in the sand are filled with a cement material which includes precipitated and alkali-free calcium carbonate particles of a grain size of from one to three microns and clay particles of odd grain sizes ranging from the size of the calcium carbonate particles to the size of the particles of cement employed. This permits a maximum amount of calcium carbonate and clay to replace Portland cement while retaining the properties of high density and imperviousness and while avoiding the presence of free alkali. The gypsum functions as a part of the cement, as well as controlling the setting time of the mortar.

Thus, it has been found that a dense mortar is produced which, due to its high density, is well above standard in strength, is highly impervious to water and has a relatively low rate of expansion and contraction. The mortar, due to its lack of free alkali, is sound and at the same time, due to the fine grained structure of its constituents, is of high plasticity and easy to handle with a trowel. The precipitated calcium carbonate also gives the mortar a light color. This color may be retained indefinitely since the mortar is practically free of alkali and thus non-staining. This makes the mortar particularly adaptable for tile and stone work such as used for decorative purposes. The density of the mortar and its low rate of expansion and contraction also makes it especially suitable for such use, as well as for brick work. The clay and calcium carbonate, as inert fillers, aid in rendering the mortar waterproof and this characteristic may be made more pronounced by the addition of a small amount of fatty or waxy material, as for example, 0.2 per cent tallow. The cement composition for the mortar has a high sand carrying capacity and is economical due to the use of a minimum of Portland cement.

As many changes could be made in the above compositions and methods, and many apparently widely different embodiments, and methods could be utilized in practicing this invention without departing from the spirit thereof, it is intended that all matter contained in the above description shall be interpreted as illustrative and not in a limiting sense.

What is claimed is:

1. A mortar cement comprising a dry, granular mixture of approximately 75% aggregate, approximately 11¾% ground Portland cement clinker, approximately 11¾% to 7½% precipitated calcium carbonate, approximately ¾ to 5% clay, and approximately ¾% gypsum.

2. A mortar cement composition comprising, in combination in substantially the proportions indicated:

| | Parts by weight |
|---|---|
| Aggregate | 300 |
| Ground Portland cement clinker | 47 |
| Precipitated calcium carbonate | 47 to 30 |
| Clay (aluminosilicates) | 3 to 20 |
| Gypsum | 3 | said materials reacting when mixed with water to provide a workable mortar composition having troweling plasticity without the inclusion of alkaline materials.

3. A mortar cement comprising a dry, granular mixture of approximately 75% aggregate, approximately 11¾% ground Portland cement clinker, approximately 11¾ to 7½% precipitated calcium carbonate, approximately ¾ to 5% clay, and approximately ¾% gypsum, the precipitated calcium carbonate being of a grain size on the order of approximately 1 to 3 microns.

4. A mortar cement comprising a dry, granular mixture of approximately 75% aggregate, approximately 11¾% ground Portland cement clinker, approximately 11¾ to 7½% precipitated calcium carbonate, approximately ¾ to 5% clay, and approximately ¾% gypsum, the precipitated calcium carbonate being of a grain size in the order of approximately 1 to 3 microns and substantially devoid of free alkali.

5. A mortar cement comprising a dry, granular mixture of approximately 75% aggregate, approximately 11¾% ground Portland cement clinker, approximately 11¾ to 7½% precipitated calcium carbonate, approximately ¾ to 5% clay, and approximately ¾% gypsum, the precipitated calcium carbonate being of a grain size in the order of 1 to 3 microns and substantially devoid of free alkali, and the clay being of any common type having as its basic constituent a hydrous aluminosilicate, the gypsum being used in such proportion as to regulate within desired limit the setting time of the cement composition.

6. A cement composition comprising a dry granular mixture of approximately 47% ground Portland cement clinker, approximately 3% gypsum, from 30 to 47% precipitated calcium carbonate and from 20 to 3% clay.

7. A cement composition comprising a dry granular mixture of approximately 47% ground Portland cement clinker, approximately 3% gypsum, from 30 to 47% precipitated calcium carbonate and from 20 to 3% clay, said composition being substantially devoid of free alkali.

8. A cement composition comprising a dry, granular mixture of approximately 47% ground Portland cement clinker, approximately 3% gypsum, from 30 to 47% precipitated calcium carbonate, and from 20% to 3% clay, said composition containing less than ½ of one per cent of free alkali.

9. A cement composition comprising a dry, granular mixture of approximately 47 parts, by weight, ground Portland cement clinker, approximately 3 parts gypsum, from 30 to 47 parts precipitated calcium carbonate, from 3 to 20 parts clay, and approximately 0.2 parts tallow.

10. A mortar cement comprising a dry, granular mixture of approximately 75% aggregate, approximately 11¾% ground Portland cement clinker, approximately 11¾% to 7½% precipitated calcium carbonate, approximately ¾% to 5% clay, and approximately ¾% gypsum, the precipitated calcium carbonate being of a grain size in the order of approximately 1 to 3 microns, and such composition containing less than ½ of one percent free alkali.

11. The method of compounding a cement composition for mortars substantially free from uncombined lime which includes the steps of intermingling clay and precipitated calcium carbonate while washing with water to remove water soluble alkalies therefrom, adding hot Portland cement clinker to the wet mixture of clay and precipitated calcium carbonate and drying this mixture, and then adding a small amount of gypsum and grinding the resultant mixture to a fine grained condition.

12. The method of compounding a cement composition for mortars substantially free from uncombined lime which includes the steps of intermingling water, clay and precipitated calcium carbonate, the latter in the form of a waste material from the production of alkalies, allowing solid matter to settle and removing the bulk of the water together with water soluble alkalies, washing with water and filtering the mixture of clay and calcium carbonate to further reduce the alkali content thereof, adding hot Portland cement clinker to the wet mixture of clay and calcium carbonate, and drying this mixture, and then adding a small amount of gypsum and grinding the resultant mixture to a condition of fineness such that about 96% passes through a sieve having 325 meshes to the linear inch.

13. A mortar cement composition in the form of a dry granular mixture comprising approximately 47% ground Portland cement clinker and 30% to 47% precipitated calcium carbonate.

14. A mortar cement composition adapted to be subsequently mixed with sand or the like to make mortar comprising a mixture of approximately 47% by weight of ground Portland cement clinker, from 30 to 47% precipitated calcium carbonate and approximately 3% gypsum, the whole being ground to a fine-grained condition and being substantially free from water soluble alkalies.

15. The method of compounding a mortar cement which comprises washing precipitated calcium carbonate to remove water soluble alkalies therefrom and mixing the precipitated calcium carbonate with clay, filtering the mixture to reduce the water content and to further remove water soluble alkalies, adding hot Portland cement clinker to the mixture and drying the resulting mixture, adding a small quantity of gypsum, and then grinding the final mixture to a fine-grained condition.

ADELBERT C. EICHENLAUB.